(No Model.)

W. W. WHITCOMB.
COMPOSITE BRAKE SHOE.

No. 562,872.  Patented June 30, 1896.

WITNESSES.
Matthew M. Blunt.
J. Murphy.

INVENTOR.
William W. Whitcomb
By Jas. H. Churchill
ATT'Y.

UNITED STATES PATENT OFFICE.

WILLIAM W. WHITCOMB, OF BROOKLINE, MASSACHUSETTS, ASSIGNOR TO THE COMPOSITE BRAKE SHOE COMPANY, OF BOSTON, MASSACHUSETTS.

COMPOSITE BRAKE-SHOE.

SPECIFICATION forming part of Letters Patent No. 562,872, dated June 30, 1896.

Application filed September 7, 1895. Serial No. 561,766. (No model.)

*To all whom it may concern:*

Be it known that I, WILLIAM W. WHITCOMB, a citizen of the United States, residing in Brookline, county of Norfolk, and State of Massachusetts, have invented an Improvement in Composite Brake-Shoes, of which the following description, in connection with the accompanying drawings, is a specification, like letters on the drawings representing like parts.

This invention relates to a clutch or brake shoe of the class shown and described in United States Patent No. 490,701 granted to me January 31, 1893, to which reference may be had.

In accordance with this present invention, the brake-shoe is provided with preferably a series of holes or sockets extending from the face toward the back of the shoe, preferably for only a portion of the tickness of the shoe, and into which are inserted plugs or portions, preferably non-metallic, and for the best results of wood, the said sockets being constructed as will be described, whereby the non-metallic plug is compressed as it is driven into its socket, thereby largely increasing the adhesion between the non-metallic plug and the metal walls of the socket and firmly securing the said plug in its socket. The sockets referred to are made tapering for the whole or a portion of their length, and the tapered portion of the sockets may be provided with one or more enlargements to assist the adhesion of the plug, as will be described. These and other features of this invention will be pointed out in the claims at the end of this specification.

Figure 1:
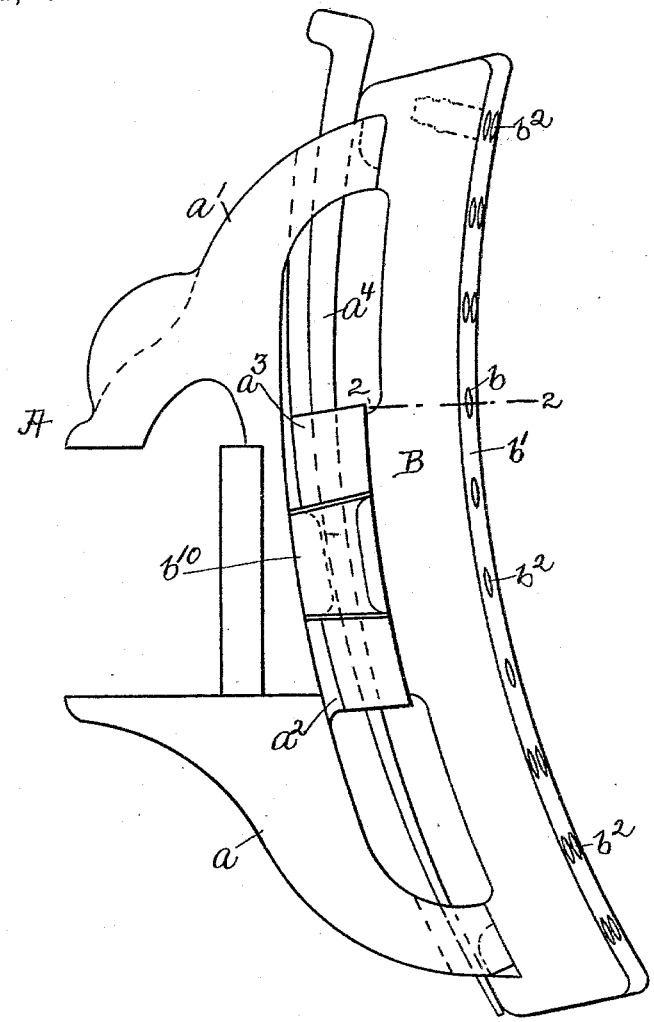
Figure 2:
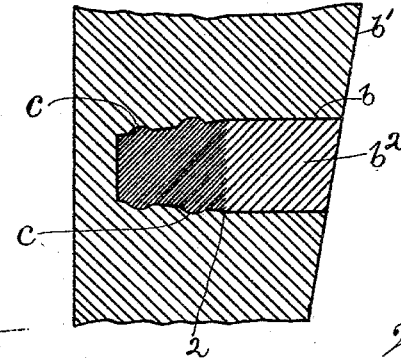

Figure 1 is a side elevation of a Master Car-Builders' brake-head provided with a brake-shoe embodying this invention; and Fig. 2, a sectional detail on the line 2 2, Fig. 1.

The brake-head A, provided with the arms $a$ $a'$ and with the lugs or ears $a^2$ $a^3$, is and may be of any usual or suitable construction and substantially such as shown in my patent referred to.

The brake-head A, as shown in Fig. 1, has secured to it, as by a key or spline $a^4$, a brake-shoe B, which is provided with a number of holes or sockets $b$, (see Fig. 2,) extended from the front face $b'$ toward the rear face or back of the shoe, the said holes or sockets being, in accordance with this invention, made tapering from the front face $b'$ of the shoe toward the back of the shoe for the whole or a portion of their length, for a purpose, as will be described. In the present instance I have chosen to illustrate the sockets $b$ (shown in Fig. 2) as made substantially straight from the front face of the shoe toward the rear end of the socket for substantially one-half its length, namely, to a point marked 2 and from the point 2 to its rear end. The said socket is made tapering, so that the diameter or area of the rear end of the socket or hole B is materially less than the diameter or area of the socket at the face of the shoe.

The sockets $b$ receive in them plugs $b^2$, preferably of non-metallic material, such as wood, the said plugs being normally of substantially uniform diameter throughout their length, which diameter is substantially equal to the diameter of the socket $b$ at the face of the shoe, so that the plug may be fitted into its socket somewhat snugly. As the plug is driven or otherwise forced into its socket its rear end is subjected to compression by the converging or tapering walls of the rear portion of the socket, which compression of the non-metallic plug, as demonstrated by practical tests, increases the adhesion between the non-metallic plug and the walls of its socket to such extent as to prevent the plug being withdrawn from its socket.

I may prefer to make the socket for the plug tapering for substantially one-half its length, as represented in Fig. 2; but I do not desire to limit my invention to any particular length of taper for the socket, and, furthermore, the tapered socket may be provided with one or more enlargements $c$, herein represented as annular in form, and which, in practice, afford room for the expansion into them of the compressed portion of the non-metallic plug, which construction, I believe, increases the adhesion of the non-metallic plug in its socket. Furthermore, this construction of tapered socket with the enlargements may be utilized to advantage with plugs which are not non-metallic, as, for instance, the said plug may in this case be made of a softer metal, such, for instance, as lead, or, if desired, it may be made of harder metal, and the enlargements $c$ may be made pronounced, so as to obtain a secure hold of the plug in its tapered socket.

The tapered sockets may and preferably will extend but partially through the brake-shoe B; but, if desired, they may extend entirely through the said shoe and be closed on their back in any suitable or desired manner or they may be left open on their rear side.

The brake-shoe B may be secured to the brake-head A by the spline or key $a^4$, extending through a slotted ear $b^{10}$ on the back side of the said shoe.

When the plug $b^2$ is made of non-metallic material, such as wood, which construction I prefer, the plug, as it is driven home, is compressed at its rear end, as represented by the fine shading in Fig. 2, and the fibers being compressed naturally tend to return to their normal position, and as a result the adhesion between the plug and the walls of its socket is augmented, so that the plug is securely held in its socket and is not liable to work loose therefrom, as by the contraction of the wood.

I claim—

1. A composite brake-shoe consisting of a metallic portion having one or more sockets or holes tapering toward the rear side of the shoe, and a non-metallic portion of substantially the same diameter as the sockets or holes at the face of the shoe forced into the said holes or sockets and having their rear ends compressed by the tapered portion of the socket, substantially as and for the purpose specified.

2. A composite brake-shoe consisting of a metallic portion having one or more sockets or holes tapering toward the rear or back side of the shoe and provided with one or more enlargements in the tapered portion, and plugs or portions of different material inserted into the said sockets and extending into the said enlargements, substantially as described.

3. A composite brake-shoe consisting of a metallic portion having one or more sockets or holes tapering toward the rear side of the shoe and provided with one or more enlargements in the tapered portion and non-metallic portions or plugs inserted into the said holes or sockets and of substantially the same diameter at their entering ends as the sockets or holes at the face of the shoe, the said plugs having their rear ends compressed and in part expanded into the said enlargements, substantially as described.

In testimony whereof I have signed my name to this specification in the presence of two subscribing witnesses.

WILLIAM W. WHITCOMB.

Witnesses:
JAS. H. CHURCHILL,
J. MURPHY.